(12) United States Patent
Eggleston

(10) Patent No.: US 7,624,211 B2
(45) Date of Patent: Nov. 24, 2009

(54) METHOD FOR BUS WIDTH NEGOTIATION OF DATA STORAGE DEVICES

(75) Inventor: David Eggleston, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 237 days.

(21) Appl. No.: 11/823,262

(22) Filed: Jun. 27, 2007

(65) Prior Publication Data

US 2009/0006691 A1  Jan. 1, 2009

(51) Int. Cl.
*G06F 13/14* (2006.01)
(52) U.S. Cl. .................................. 710/66; 710/307
(58) Field of Classification Search .............. 710/66, 710/307
See application file for complete search history.

(56) References Cited

U.S. PATENT DOCUMENTS

| | | | | |
|---|---|---|---|---|
| 4,987,529 | A * | 1/1991 | Craft et al. ................. | 710/113 |
| 5,025,415 | A * | 6/1991 | Masuyama et al. ............. | 365/52 |
| 5,119,486 | A * | 6/1992 | Albonesi .................... | 711/172 |
| 5,179,542 | A * | 1/1993 | Reese et al. ................. | 367/135 |
| 5,600,801 | A * | 2/1997 | Parks et al. ................. | 710/301 |
| 5,613,078 | A * | 3/1997 | Kishigami .................. | 710/307 |
| 6,481,629 | B1 * | 11/2002 | Hirabayashi et al. ......... | 235/487 |
| 6,842,840 | B1 | 1/2005 | Reohr, Jr. et al. | |
| 6,901,457 | B1 * | 5/2005 | Toombs et al. ............... | 710/11 |
| 6,906,961 | B2 | 6/2005 | Eggleston | |
| 6,972,979 | B2 * | 12/2005 | Iida et al. .................... | 365/51 |
| 7,009,846 | B1 * | 3/2006 | Wang et al. .................. | 361/737 |
| 7,036,054 | B2 | 4/2006 | Floman | |
| 7,085,875 | B1 * | 8/2006 | Yona et al. .................. | 710/307 |
| 7,193,899 | B2 | 3/2007 | Eggleston | |
| 7,457,942 | B2 * | 11/2008 | Yamamoto et al. ............. | 713/1 |
| 2003/0056050 | A1 * | 3/2003 | Moro ........................ | 710/301 |
| 2004/0107327 | A1 * | 6/2004 | Takahashi et al. ........... | 711/170 |
| 2004/0137805 | A1 * | 7/2004 | Mylly et al. ................ | 439/894 |
| 2005/0005209 | A1 | 1/2005 | Floman | |
| 2005/0190599 | A1 | 9/2005 | Eggleston | |
| 2005/0193170 | A1 | 9/2005 | Endo | |
| 2005/0204091 | A1 | 9/2005 | Kilbuck | |

(Continued)

FOREIGN PATENT DOCUMENTS

WO  WO 2005076143 A1 *  8/2005

OTHER PUBLICATIONS

"SDIO Card Specification," Oct. 2001, SD Association, Hollister, CA, USA, XP002493459.

(Continued)

*Primary Examiner*—Paul R Myers
(74) *Attorney, Agent, or Firm*—Fletcher Yoder

(57) ABSTRACT

There is provided a method and apparatus for bus width negotiation. One such method includes determining a configuration of a first bond pad, the first bond pad indicating whether a host is configured to communicate with a fixed data storage device or a removable data storage device. If the first bond pad indicates the host is configured to communicate with a fixed data storage device, then the method additionally includes determining the configuration of a second bond pad. The second bond pad indicates the supported bus width of the fixed data storage device.

20 Claims, 5 Drawing Sheets

U.S. PATENT DOCUMENTS

2005/0211786 A1* 9/2005 Iida et al. .................... 235/492
2006/0256624 A1 11/2006 Eggleston
2007/0061672 A1 3/2007 Eggleston
2007/0088940 A1 4/2007 Conley

OTHER PUBLICATIONS

Invitation to Pay Additional Fees and, Where Applicable, Protest Fee; European Patent Office, Sep. 9, 2008.

* cited by examiner

METHOD FOR BUS WIDTH NEGOTIATION OF DATA STORAGE DEVICES

BACKGROUND

1. Field of the Invention

Embodiments of the present invention relate generally to the field of data storage and more particularly to transferring data to and from a data storage device.

2. Description of the Related Art

Many popular consumer electronic devices utilize removable data storage devices such as flash memory cards for saving digital content such as photos, music, video or personal data. Several flash memory card standards have been developed, including MultiMediaCard (MMC), Secure Digital Card (SD Card), and Memory Stick, for example. In addition to the removable memory cards that are commonly used, non-removable data storage devices (i.e. "fixed" storage devices) are experiencing increased use. Examples of the fixed data storage devices include a ball grid array multimedia card (MMC BGA), based on the MMC interface, and iNAND, from SanDisk, based on the SD interface. These fixed data storage devices are very similar to their removable data storage device counterparts in how they operate.

The specifications for the removable storage devices originally limited the communication bus between a host system and the removable data storage devices to a single data line (e.g. the ×1 data bus, wherein a data bus can comprise one or more data lines) in order to keep the number of physical connections between the data storage devices and the host to a minimum, wherein such physical connections are referred to herein as contacts, with one example of a contact being a pin. However, as the size of the digital content files stored on the data storage devices has grown so has the data storage capacity of the data storage devices. As a result, the need for faster data transfer between the host and the data storage devices has also increased.

One method for increasing the data transfer rate is increasing the data bus width. For example the data bus width may be increased from ×1 to ×4 or ×8. The ×1, ×4 and ×8 connote the number of data lines. Existing techniques for establishing a wider bus communication include initiating communications between the host and the data storage devices over a default ×1 data bus. The host then queries the data storage devices over the ×1 data bus to extract information about alternative bus configurations supported by the device. If both the host and the data storage device support a wider bus, the host issues a command and the data storage device and the host are re-configured to operate using the wider bus. Unfortunately, this method is somewhat cumbersome when implemented. Specifically, it requires a series of decisions to be made by the host based on the information received from the data storage device. Thus, the host's operating code must branch and each data bus configuration is handled separately. Additionally, switching from the default ×1 bus to a wider bus occurs while the data storage device is active. This requires host interface hardware to be on, allowing for the possibility of a hot switching condition with the memory card.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A versatile data storage controller is provided that should allow for an improved initialization flow. Specifically, the controller can be used for removable data storage devices as well as fixed data storage devices, the removable storage devices following a standard initialization sequence and the fixed storage devices following an abbreviated initialization sequence. The abbreviated initialization sequence eliminates a number of steps in the standard initialization sequence, as discussed below, such as to increase the speed of initialization.

Additionally, improved techniques for bus width negotiation that may be used instead of following the standard initialization to allow for bus width determination prior to data communication occurring across the bus are also described. Specifically, in accordance with one bus width negotiation technique, one or more dedicated pins are provided on the storage device that are hard-wired to indicate one of two states. The state indicated by one such pin can be used to indicate the bus width supported by the removable storage device. In accordance with an alternative technique a dedicated pin is used to provide a signal (e.g. representing a series of bits) indicative of a supported bus width. In accordance with yet another alternative technique, the series of bits may be multiplexed on a pin used for other functions. Each of the above mentioned embodiments and techniques are set forth in greater detail below.

Figure 1:
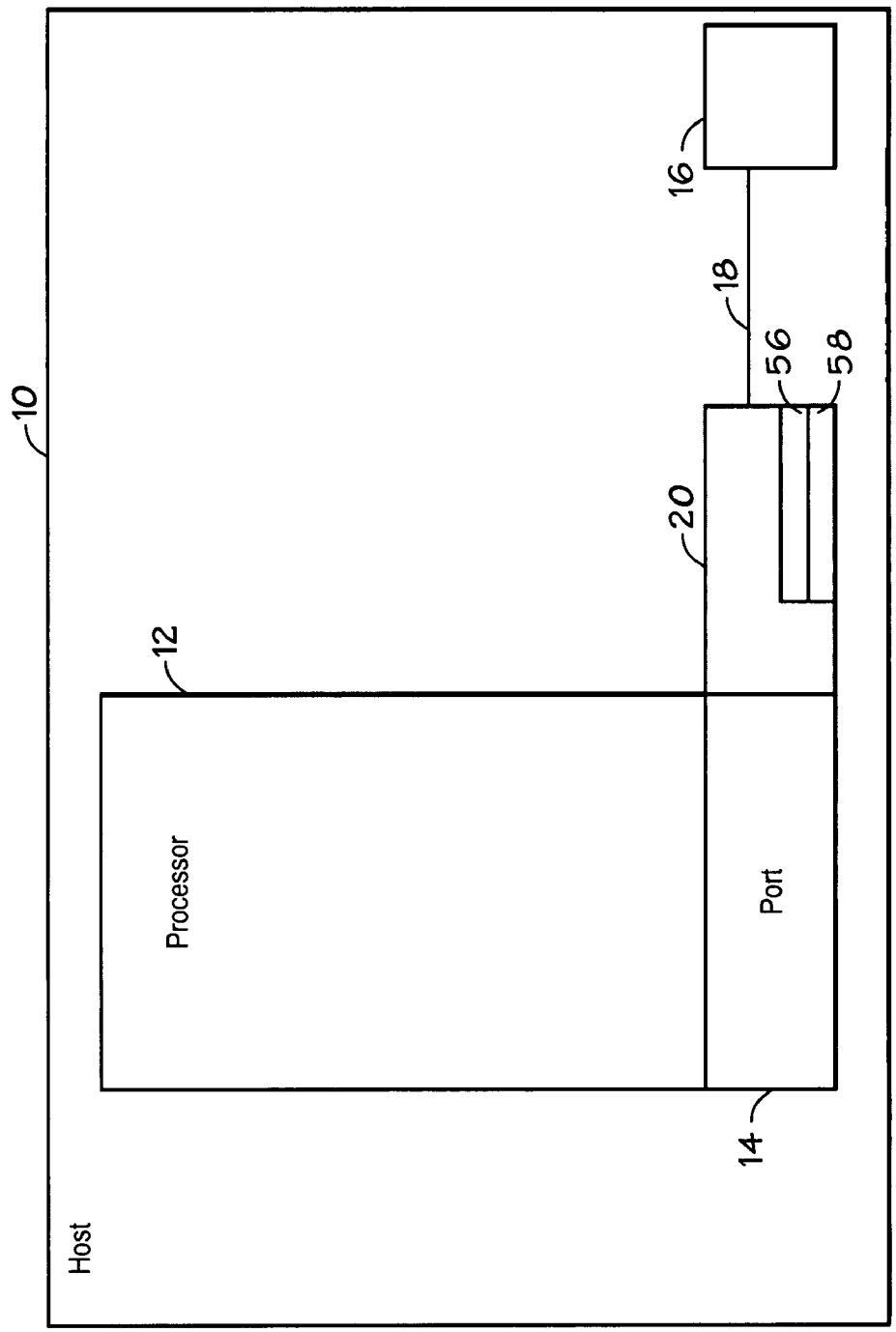
FIG. 1 illustrates a host system configured to communicate with a fixed data storage device in accordance with an embodiment of the present invention.

Turning to the figures and referring initially to FIG. 1, a host is illustrated in accordance with an exemplary embodiment of the present invention and generally referred to by the reference numeral 10. The host 10 may be a consumer electronic device, such as, a cell phone, a personal digital assistant (PDA), a handheld computer, game console, a personal computer (PC), or a notebook computer, for example.

The host 10 may have a processor 12 configured with a port 14. The port is dedicated to communications with a data storage device, such as a fixed storage device 16. The processor 12 and the fixed storage device 16 communicate over a bus 18 via a controller 20. The fixed storage device 16 may be a non-volatile memory such as a flash memory device, such as a flash memory card, and may be capable of storing blocks of data. In an actual implementation, it should be understood that the processor 12 may be configured with a number of ports to allow the host 10 to provide a variety of services to a user. For example, the host 10 may have ports dedicated to wireless communication antennas, video outputs, cameras, etc.

Figure 2:
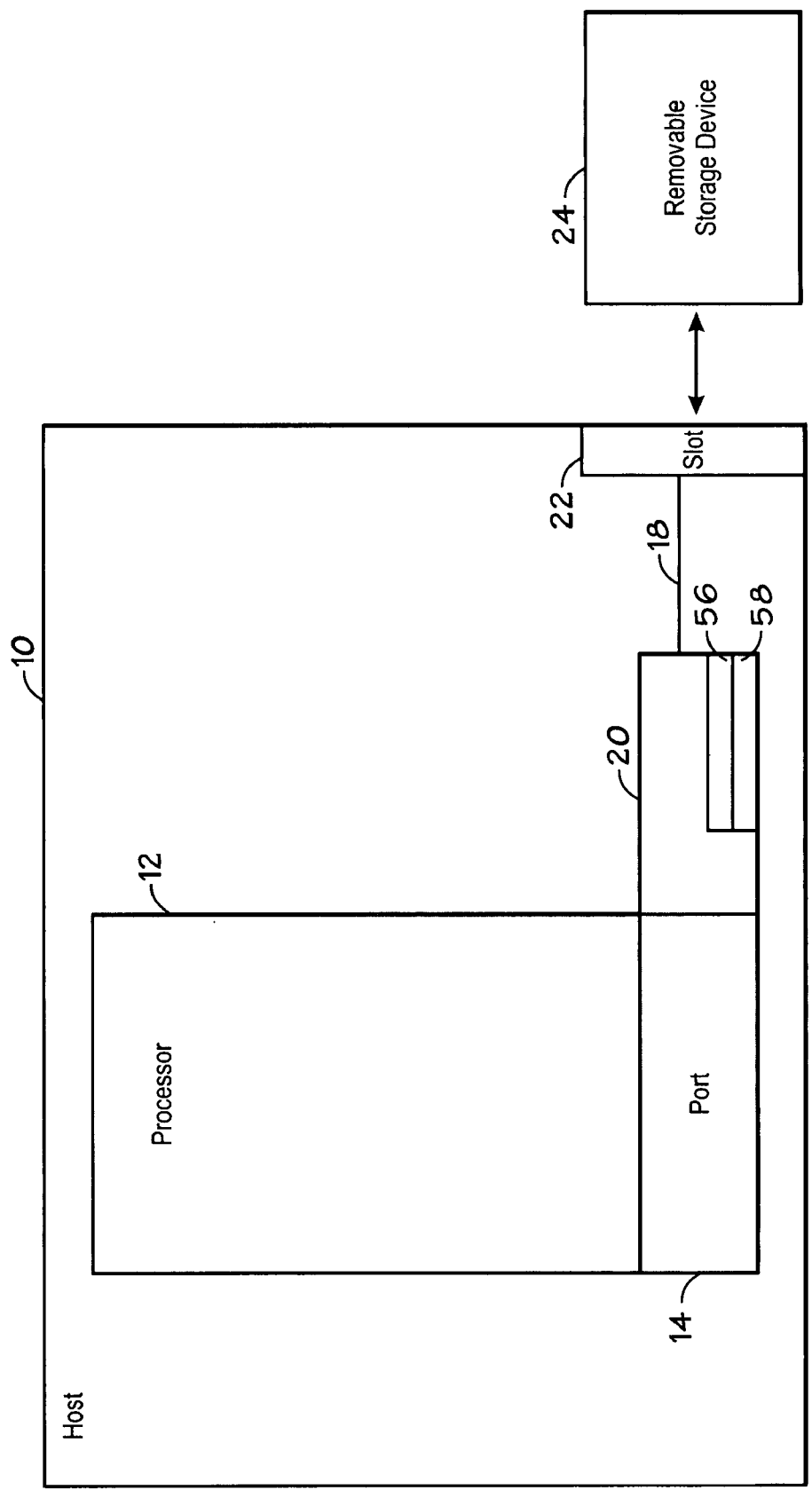
FIG. 2 illustrates the host system of FIG. 1 configured to communicate with a removable data storage device in accordance with an alternative embodiment of the present invention.

In one or more alternative embodiments, shown in FIG. 2, the host 10 may have a slot 22 into which a removable storage device 24, such as a MMC, SD card, SDIO card, or MS card, for example, may be inserted. As each particular type of removable storage device may have a different form factor, the slot 22 may be configured to receive a particular type or several different types of removable storage devices. While inserted into the slot 22, the removable storage device 24 and the processor may communicate via the bus 18. As the fixed storage device 16 and the removable storage device 24 are similar in operation, the controller 20 may be configured to be compatible with the removable storage device 24 and the fixed storage device 16.

Figure 3:
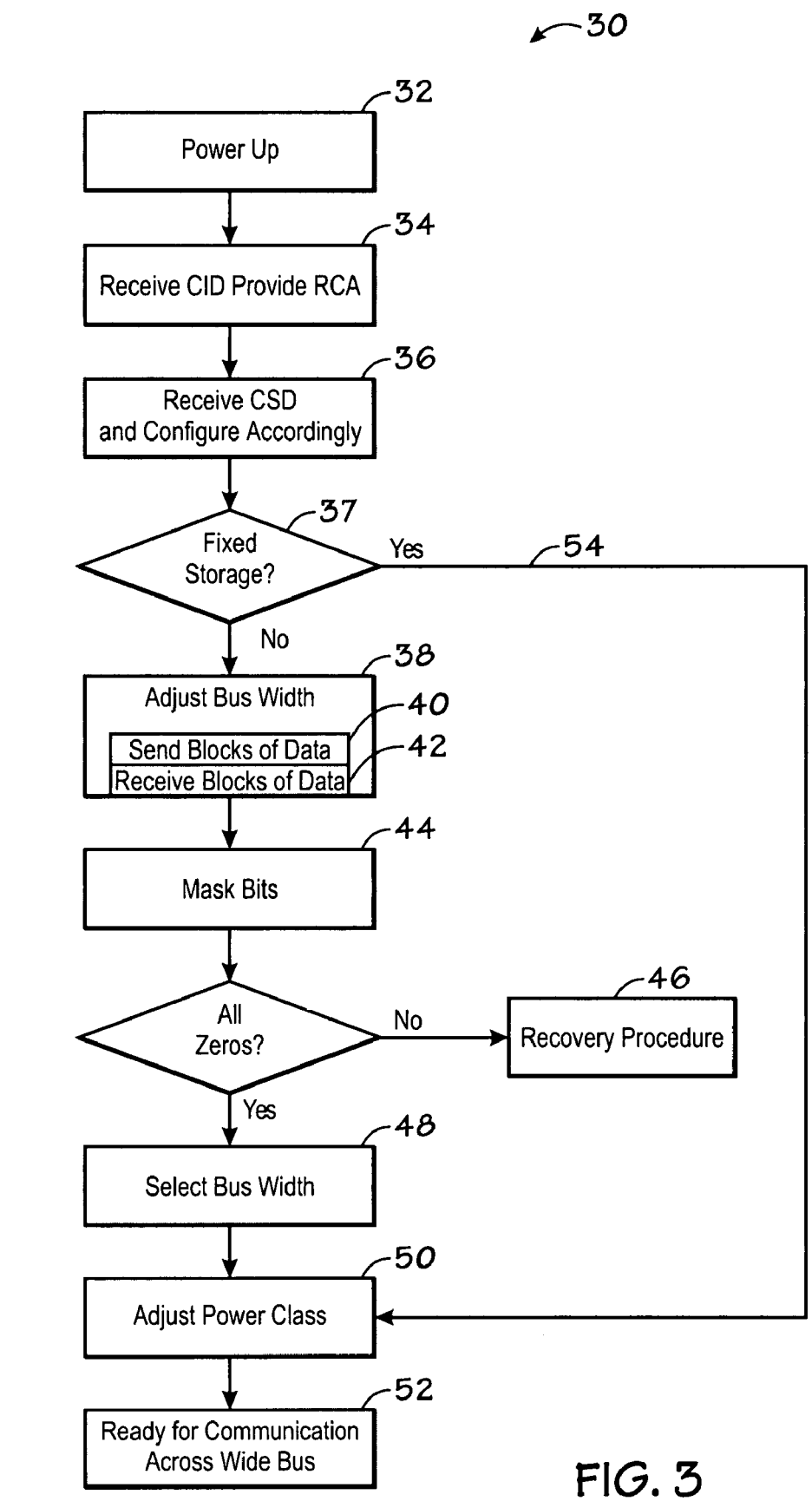
FIG. 3 illustrates a flow chart of an initialization sequence for data storage devices in accordance with an embodiment of the present invention.

A standard initialization sequence 30 is illustrated in FIG. 3. The standard initialization sequence 30 begins by powering up the storage device, as indicated at block 32. A power up sequence may include applying a particular voltage to the bus, setting a clock in the storage device, and determining an operating voltage level according to the particular specification for the storage device. Next, the host receives an identification number corresponding to the storage device (e.g., in the case of a flash card, a CID) and provides a relative address, e.g. in the case of a flash card, a (RCA) assignment for the storage device, as indicated at block 34. The host 10 then receives storage device specific data (e.g., CSD) information that allows the host to know how to access the device and adjust host parameters accordingly, as indicated at block 36. Up to this point, in a standard initialization procedure, all of the information has been communicated between the storage device and the host using a default bus width, e.g., ×1.

The initialization process 30 continues by determining if the device is fixed, as indicated at decision block 37. If the device is removable, the bus width is adjusted, as indicated at block 38. Specifically, for example, the bus width is adjusted from the ×1 bus width to a wider bus width (×4 or ×8), if supported by both the host and the device. The bus width adjustment can include a number of steps including sending blocks of data to the device and receiving blocks of data back from all available data lines, as indicated at blocks 40 and 42. The size of the received data block may be used by the host to determine the bus width supported by the device. For example, if eight bytes are received by the host, the device has eight available data lines. The received data may then be masked with the data initially sent during bus width determination and resent to the device, as indicated at block 44. As a result of the masking, all the data should be zero. Any other result indicates an error and a recovery procedure is initiated, as indicated at block 46. If the masking results in all zeros, then the host may select a bus width, as indicated at block 48. Following the determination of the bus width, the power class can be adjusted, as indicated at block 50. The power class adjustment is made based on the power requirements/capabilities of the device. The default power class provides minimum current consumption for the card type. Generally, in the default power class 1.8 V are supplied. However, devices may also be configured to operate in a high power class (supplying 3.3 V) or a dual-power class, which supports both default power class (1.8 V) and high power class (3.3 V). Once the bus width and power class are selected, the host and device are ready for communication across the bus using the new configuration, as indicated at block 52.

If, however, the data storage device is fixed, the host may know the common bus width supported by fixed data storage device before initialization of the device begins and the initialization steps of blocks 38-48 are no longer needed, as indicated by decision block 37 and line 54. One possible implementation for defining the wider data bus width of the fixed data storage device before initialization begins is described below.

As discussed above with regard to FIGS. 1 and 2, a data storage controller can be designed that supports both a standard initialization sequence and an abbreviated initialization sequence. In accordance with one or more embodiments, the controller 20 may have aspects of its hardware configured differently, such as by having two configurable bond pads: a first bond pad 56 for mode selection, and a second bond pad 58 for default data bus width. Each bond pad may be configured with a pull-up circuit internal to the controller so that if left floating (not bonded) the resulting state is a "1". Alternatively, if the bond pad is tied to ground, the resulting state is a "0". After power-up and internal reset of controller logic, controller hardware configures itself based on Table 1, shown below.

TABLE 1

| Mode Selection | Data Bus | Result |
|---|---|---|
| 0 | 0 | Standard initialization sequence—requires bus width determination procedure |
| 0 | 1 | Standard initialization sequence—requires bus width determination procedure |
| 1 | 0 | Abbreviated initialization sequence—×4 data bus predefined |
| 1 | 1 | Abbreviated initialization sequence—×8 data bus predefined |

If the host 10 is configured to use a removable storage device 24, as illustrated in FIG. 2, the bond pads 56 and 58 may be configured to allow for bus width determination steps to be carried out. For example, as set forth in Table 1, if the controller hardware detects that the mode section bond pad 56 is tied to ground (indicating one state), a standard initialization sequence requiring bus determination should be followed in accordance with conventional procedures, or alternative procedures described below. The bus negotiation allows for the host 10 to know the supported bus widths of the removable storage devices which may vary and may not be known in advance by the controller 20.

If, however, the mode selection bond pad 56 is detected to be floating (representing another state), an abbreviated initialization sequence can be followed. As such, no bus width determination procedure need be performed. The data bus bond pad 58 indicates the supported bus width, either ×4 or ×8. For example, as indicated in Table 1, if the data bus bond pad 58 indicates a 0 state, then a ×4 bus is indicated and if the data bus bond pad 58 indicates a 1 state, a ×8 bus is indicated. If, as illustrated in FIG. 1, a fixed storage device 16 is provided, the bond pads can be configured to indicate the supported bus width of the fixed storage device in accordance with Table 1 because the supported bus width may be known when the fixed storage device is installed. Additionally, because the bond pads allow for the bus width determination to be performed by hardware, the bus width determination can occur without any wait periods. Thus, the improved initialization sequence increases the efficiency of the initialization process by eliminating the bus width determination procedure and by eliminating switching from operating in a ×1 bus configuration to a wider bus configuration.

As mentioned above, alternative bus width negotiation schemes may be implemented for bus width negotiation of removable storage devices. Several examples are discussed below wherein the bus width negotiation is performed by reading a bus width signal from a removable data storage device to determine the bus width of the removable data storage device. Once the bus width is determined, an enable signal is returned to the removable data storage device.

Figure 4:
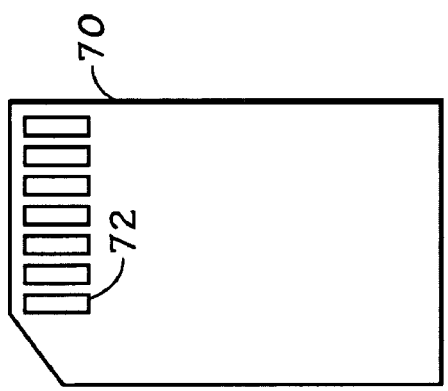
FIG. 4 illustrates a removable data storage device in accordance with an embodiment of the present invention.

For example, FIG. 4 illustrates an exemplary removable storage device 70. As illustrated, the removable data storage device has a MMC form factor, but it should be understood that the techniques described herein may be applied to all types of removable data storage devices. In accordance with the alternative bus width negotiation technique, bus width information is multiplexed on to a pin used by the device for other functions, for example, pin 72 of the removable storage device 70. The bus width determination may be performed during the "wake-up" clock cycles commonly provided by a host 10 prior to establishing communication with the removable storage device 50. After the wake-up cycles are complete the multiplexed pin 72 is no longer used for bus width determination, and it returns to its normal function.

Figure 5:
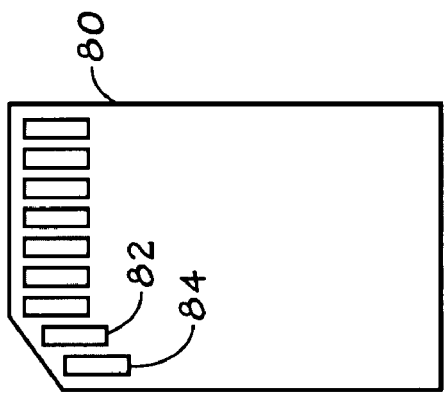
FIG. 5 illustrates a removable data storage device having additional pins in accordance with an alternative embodiment of the present invention.

In an alternative exemplary embodiment, illustrated in FIG. 5, an exemplary removable data storage device 80 is configured to indicate an increased bus width using dedicated pins. Specifically, MMC cards generally only have 7 pins, as illustrated in FIG. 4. However, the removable data storage device 80 has additional pins 82 and 84 for indicating increased bus widths are supported by the device 80. Since the pins 82 and 84 do not exist on removable data storage devices that only support a ×1 bus width, the host 10 can determine whether increased bus widths are supported by simply sensing whether the pins 82 and/or 84 are present. For example, in accordance with one alternative embodiment, pin 82 may indicate ×4 bus width support, while pin 84 may indicate ×8 bus width support. In yet another alternative embodiment, each of the extra pins 82 and 84 may be set to a state ("1" or "0") to indicate the ability of the device 80 to support a particular wider bus width, such as ×4 or ×8. In particular, the pins may be configured according to Table 1. It should be noted that the techniques described above, with reference to FIG. 5, may be asynchronous, e.g. no clock signal is used.

Figure 6:
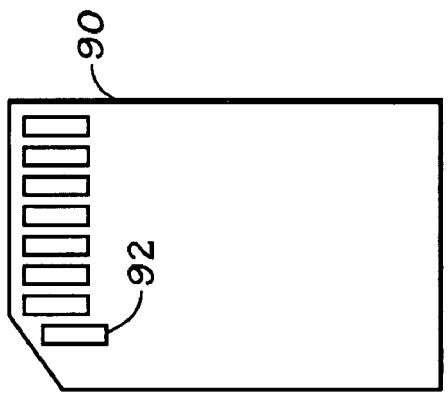
FIG. 6 illustrates a removable data storage device having a single additional pin in accordance with an alternative embodiment of the present invention.

In yet another alternative method for bus width negotiation, a dedicated pin 92 is added to a removable data storage device 90, as illustrated in FIG. 6. When power is applied to the removable storage device 90, the pin 92 drives an output signal, such as a series of bits. The output signal of pin 92 is sensed by the host 10 and used to determine the bus widths supported by the removable data storage device 90. Having received the signal from the MMC, the host 10 determines the proper bus width to use with device 90 and returns a signal indicating the bus width to be used to pin 92. In this alternative method, the activity across the bus is synchronous and a clock is sourced from the host 10 to the removable storage device 58.

Figure 7:
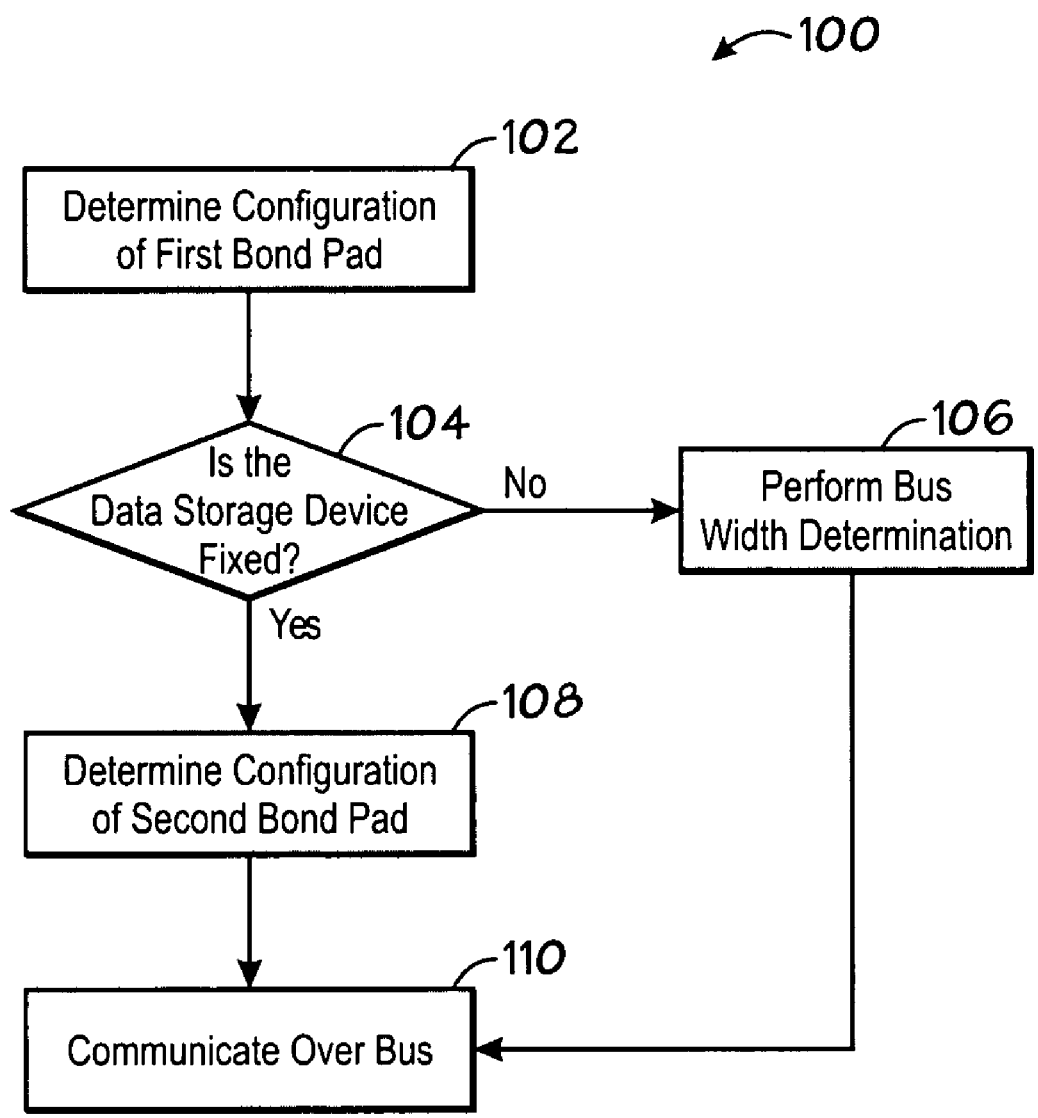
FIG. 7 is a flow chart illustrating bus width negotiation in accordance with an embodiment of the present invention.

Referring now to FIG. 7, a flow chart 100 illustrates the bus width negotiation in accordance with an embodiment of the present invention. Initially, the configuration of the first bond pad is determined, as indicated at block 102. As discussed above, the first bond pad may be a mode pad indicating whether the system is configured to communicate with a fixed data storage device or a removable data storage device. Thus, in determining the configuration of the first bond pad, it is determined whether the data storage device is fixed, as indicated at decision block 104. If it is not fixed, then a bus width determination is performed, as indicated at block 106. The bus width determination may include any of the above mentioned techniques, such as the standard technique, multiplexing information on an existing pin, or the addition of pins to the removable data storage device, for example.

Alternatively, if the first bond pad indicates that the data storage device is fixed, the configuration of the second bond pad is determined, as indicated at block 108. The second bond pad indicates the supported bus width of the fixed data storage device, as discussed above. Once the host knows the supported bus width, as indicated by the second bond pad, data communication between the data storage device and the host may begin, as indicated at block 110.

The aforementioned methods and techniques are performed before normal data communication is established between the host 10 and the removable storage device 24. By performing the negotiation prior to data communications, the host system 10 can then configure its own data bus width hardware before sending any commands, thereby eliminating the need for initiating communications over a ×1 bus and later switching to a different bus width. Additionally, the sensing operations can be handled using hardware in the host 10, eliminating the need for the operating code to make decisions regarding bus width.

What is claimed is:

1. A method comprising:
   determining a first aspect of hardware configuration, the first aspect indicating whether a host is configured to communicate with at least one of a fixed data storage device and a removable data storage device; and
   if the first aspect indicates the host is configured to communicate with a fixed data storage device,
   determining a second aspect of the hardware configuration, the second aspect indicating a bus width of the fixed data storage device.

2. The method of claim 1, comprising determining the second aspect of the hardware configuration only if the first aspect of hardware configuration indicates the host is configured to communicate with the fixed data storage device.

3. The method of claim 1, wherein determining the configuration of the first aspect of hardware comprises determining which of two states is indicated by the configuration of the aspect of hardware.

4. The method of claim 1, comprising following an initialization sequence with a bus width determination procedure if the first aspect of hardware indicates the host is configured to communicate with a removable data storage device.

5. The method of claim 4, wherein the bus width determination procedure comprises:
   reading a bus width signal from the removable data storage device to determine the bus width of the removable data storage device; and
   returning an enable signal to the removable data storage device.

6. The method of claim 5, wherein the bus width signal and the enable signal are communicated via a dedicated contact of the removable data storage device.

7. The method of claim 5, wherein the bus width signal and enable signal are communicated by multiplexing the signals on a contact of the removable data storage device.

8. The method of claim 4, wherein the bus width selection procedure comprises determining if one or more contacts are present on the removable data storage device.

9. The method of claim 1, wherein determining the second aspect of hardware configuration comprises determining whether the second aspect indicates one of two states.

10. The method of claim 9, wherein if the second aspect of hardware configuration indicates one state, the bus width is ×4 and if the configuration indicates another state, the bus width is ×8.

11. An apparatus comprising:
a controller for a data storage device configured to support a first initialization sequence and a second initialization sequence, wherein the first initialization sequence is adapted to determine a bus width of the data storage device, the controller comprising:
a first bond pad configured to indicate whether the controller should follow one of the first initialization sequence and the second initialization sequence; and
a second bond pad configured to indicate the bus width of the data storage device.

12. The apparatus of claim 11, comprising a processor coupled to the controller, the processor configured to communicate with the data storage device.

13. The apparatus of claim 11, wherein the data storage device is a fixed data storage device and the first bond pad is configured to indicate the second initialization sequence.

14. The apparatus of claim 11, wherein the data storage device is a removable data storage device, the apparatus comprising a slot configured to receive the removable data storage device and the first bond pad configured to indicate the first initialization sequence.

15. A method of operation comprising:
determining if a data storage device is a fixed storage device;
following a first initialization path if the data storage device is a fixed storage device; and
following a second initialization path if the data storage device is a removable storage device, wherein determining whether a data storage device is a fixed storage device comprises determining a state of a first bond pad.

16. The method of claim 15 wherein the first initialization path comprises determining a state of a second bond pad, the state being indicative of a bus width of the data storage device.

17. The method of claim 16 comprising communicating over a ×4 bus if the second bond pad indicates a first state.

18. The method of claim 16 comprising communicating over a ×8 bus if the second bond pad is in a second state.

19. The method of claim 15 wherein the second initialization path comprises determining if one or more contacts are present on the data storage device.

20. The method of claim 19 wherein the second initialization path comprises reading a bus width signal from the one or more contacts.

* * * * *